(12) United States Patent
Kandaswamy et al.

(10) Patent No.: US 12,118,126 B2
(45) Date of Patent: Oct. 15, 2024

(54) SIMPLIFIED USER MANAGEMENT FUNCTIONALITY

(71) Applicant: TeleTracking Technologies, Inc., Pittsburgh, PA (US)

(72) Inventors: Prabhuvel Kandaswamy, Bridgeville, PA (US); Manoj Srinivas Kamavarapu, McDonald, PA (US); Timothy Klaus Schruben, Brentwood, PA (US); Thomas Francis Havranek, Jr., Baden, PA (US); Scott Joseph Jubeck, Sewickley, PA (US); Jeanne C. Iasella, Pittsburgh, PA (US)

(73) Assignee: TeleTracking Technologies, Inc., Pittsburgh, PA (US)

( * ) Notice: Subject to any disclaimer, the term of this patent is extended or adjusted under 35 U.S.C. 154(b) by 245 days.

(21) Appl. No.: 17/708,967

(22) Filed: Mar. 30, 2022

(65) Prior Publication Data

US 2022/0318413 A1 Oct. 6, 2022

Related U.S. Application Data

(60) Provisional application No. 63/169,597, filed on Apr. 1, 2021.

(51) Int. Cl.
*G06F 21/00* (2013.01)
*G06F 3/04847* (2022.01)
(Continued)

(52) U.S. Cl.
CPC ........ *G06F 21/629* (2013.01); *G06F 3/04847* (2013.01); *G06F 3/0482* (2013.01); *G06F 2221/2113* (2013.01)

(58) Field of Classification Search
CPC .. G06F 21/629; G06F 3/04847; G06F 3/0482; G06F 2221/2113; G06F 21/604; G06F 2221/2117; H04L 63/20
See application file for complete search history.

(56) References Cited

U.S. PATENT DOCUMENTS

| 2018/0020270 A1* | 1/2018 | Colonna | H04L 63/102 |
| 2021/0157978 A1* | 5/2021 | Haramati | G06F 40/177 |

OTHER PUBLICATIONS

Wilson et al., "User Interactions in Social Networks and their Implications", EuroSys '09: Proceedings of the 4th ACM European conference on Computer systems, pp. 205-218, Apr. 2009.*

(Continued)

*Primary Examiner* — Morshed Mehedi
(74) *Attorney, Agent, or Firm* — FERENCE & ASSOCIATES LLC

(57) ABSTRACT

One embodiment provides a method for providing simplified user management within a software application, the method including: receiving, within a user management interface of the software application, input from an editing user to perform an action corresponding to a user within the software application, wherein the action comprises modifying the user within the software application; validating, within the software application, the editing user is authorized to perform the action within the software application, wherein the validating includes determining the editing user is an existing user within the software application and determining the user is associated with the editing user; and performing, responsive to validating the editing user is authorized to perform the action, the action with respect to the user in the software application. Other aspects are described and claimed.

18 Claims, 3 Drawing Sheets

(51) Int. Cl.
    *G06F 21/62*     (2013.01)
    *G06F 3/0482*     (2013.01)

(56) References Cited

OTHER PUBLICATIONS

Kumar et al., "Context sensitivity in role-based access control", Operating Systems Review, ACM, New York, NY, US, vol. 36, No. 3, Jul. 1, 2022, pp. 53-66.

Kern et al., "An administration concept for the enterprise role-based access control model", Proceedings of the 8th ACM Symposium on Access Control Models and Technologies, SACMAT 2003, Villa Gallia, Como, Italy, Jun. 2- 3, 2003, [ACM Symposium on Access Control Models and Technologies], New York, NY, ACM, US, Jun. 2, 2003, pp. 3-11.

European Search Report for European Application Serial No. EP22166084, Aug. 14, 2022, 1 page.

\* cited by examiner

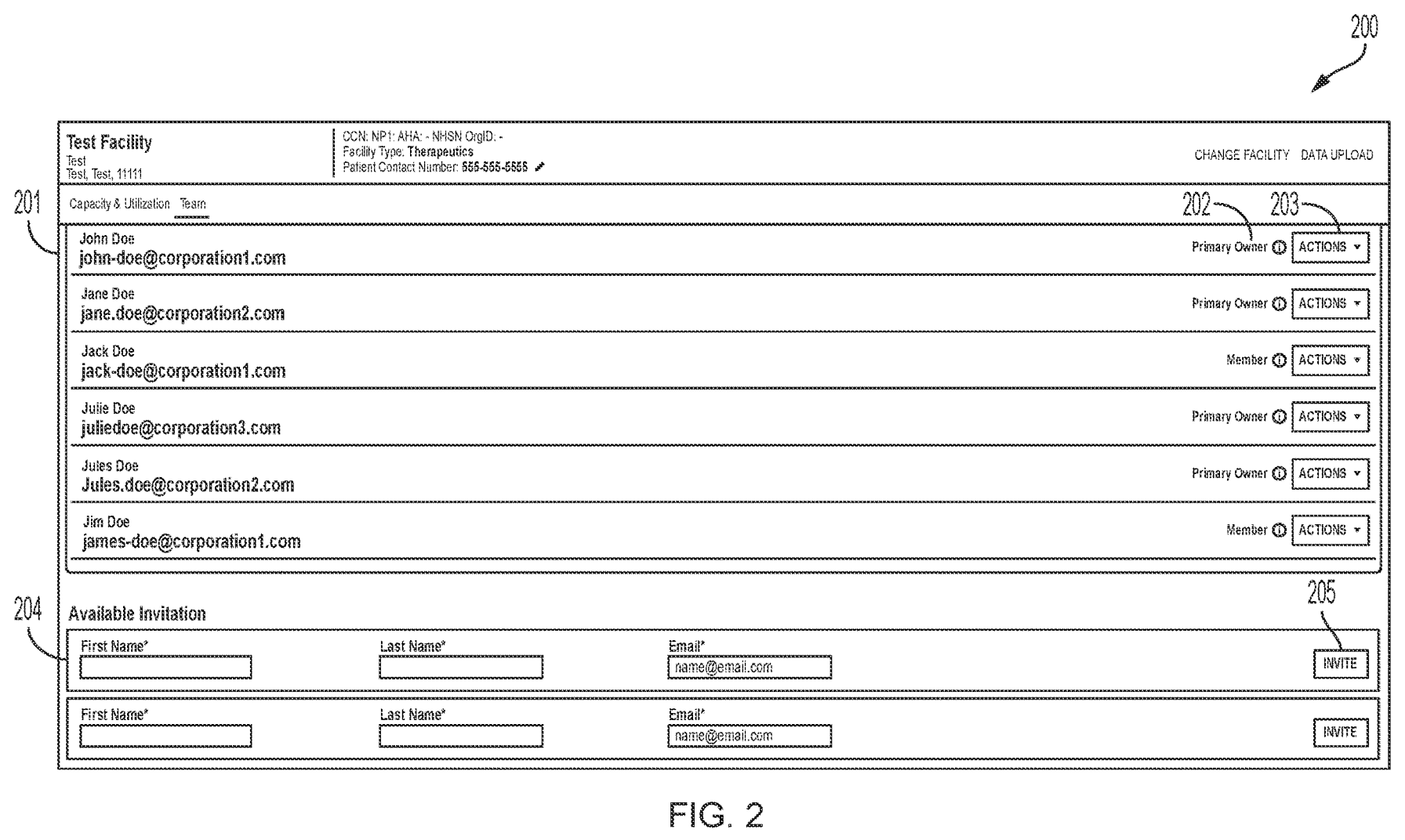

Test Facility
Test
Test, Test, 11111

CCN: NPI: AHA: - NHSN OrgID: -
Facility Type: Therapeutics
Patient Contact Number: 555-555-5555

CHANGE FACILITY  DATA UPLOAD

Capacity & Utilization  Team

| | | |
|---|---|---|
| John Doe<br>john-doe@corporation1.com | Primary Owner | ACTIONS ▼ |
| Jane Doe<br>jane.doe@corporation2.com | Primary Owner | ACTIONS ▼ |
| Jack Doe<br>jack-doe@corporation1.com | Member | ACTIONS ▼ |
| Julie Doe<br>juliedoe@corporation3.com | Primary Owner | ACTIONS ▼ |
| Jules Doe<br>Jules.doe@corporation2.com | Primary Owner | ACTIONS ▼ |
| Jim Doe<br>james-doe@corporation1.com | Member | ACTIONS ▼ |

Available Invitation

| First Name* | Last Name* | Email*<br>name@email.com | INVITE |
|---|---|---|---|
| First Name* | Last Name* | Email*<br>name@email.com | INVITE |

FIG. 2

SIMPLIFIED USER MANAGEMENT FUNCTIONALITY

BACKGROUND

Many entities have software applications that include users having permissions within the software application. The permissions may allow a user to view, edit, save, or otherwise manipulate data within the software application. Different users may have different permissions that allow the different users to perform different functions within the software application. For example, one user may have permission to only view data within the software application, whereas another user may have permission to not only view data but also edit or otherwise manipulate the data within the software application. The entity hosting or providing the software application may set the different permissions and levels of permissions that allow different users to perform different functions. By having different permission sets, the entity can better control the data within the software application and can also control the users who have access to the data within the software application.

BRIEF SUMMARY

In summary, one aspect provides a method for providing simplified user management within a software application, the method including: receiving, within a user management interface of the software application, input from an editing user to perform an action corresponding to a user within the software application, wherein the action comprises modifying the user within the software application; validating, within the software application, the editing user is authorized to perform the action within the software application, wherein the validating includes determining the editing user is an existing user within the software application and determining the user is associated with the editing user; and performing, responsive to validating the editing user is authorized to perform the action, the action with respect to the user in the software application.

Another aspect provides a method for providing simplified user management within a software application, the method comprising: displaying, on an interactive display, a user management interface display for managing at least one user within the software application, wherein the user management interface display comprises at least one adding portion for adding a new user to the software application and at least one editing portion for editing an existing user within the software application; displaying, in the user management interface display and in response to an editing user selecting an interactive icon within the editing portion, an interactive menu providing actions allowing for editing an existing user, wherein the displaying comprises validating the editing user is authorized to edit the existing user by determining the editing user is an existing user within the software application and determining the editing user is associated with the user; and displaying, in the user management interface display and in response to the editing user providing input for adding a new user within the at least one adding portion, information corresponding to the new user, wherein the displaying comprises validating the editing user is authorized to add the new user by determining the editing user is an existing user within the software application and determining the editing user is associated with the user.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 2 illustrates an example graphical user interface of the simplified user management functionality.

DETAILED DESCRIPTION

Figure 1:
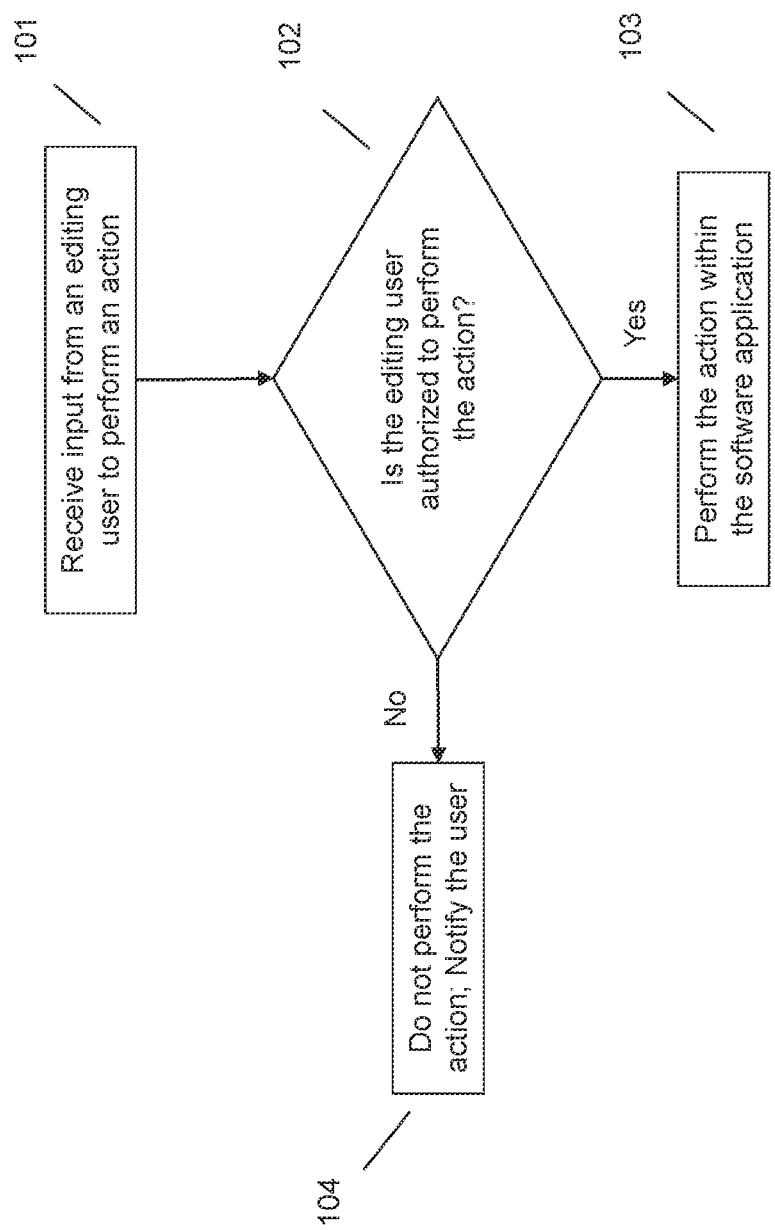
FIG. 1 illustrates an example method of simplified user management functionality for managing users within a software application.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Conventionally, there is a single department or user within the entity that controls the users that have permissions within the software application. For example, the information technology (IT) department may be responsible for adding users and corresponding permissions to the software application or modifying permissions for existing users. Thus, in order for a user to be added or modified, including deletions, a request has to be submitted to the department or user within the entity. The request generally needs to include information for the user to be added, including what permissions the user should have within the software application, or information identifying the modifications that need to be made to existing users. The department or user processes the request by making the changes to the software application to add or modify the requested user.

However, the time between the submission of the request and the processing of the request may be very long, particularly in large entities. For example, some requests may take weeks to process. This means that the modifications, including additions and removals, will not be made until the request is processed, which causes user frustration for those users needing to be added or have additional permissions and may even become a security risk in the case that a user needs to be removed. For example, if a user needs to be removed from the software application, allowing the user to remain as a user within the software application until the request is processed may pose a security risk.

Accordingly, the described system and method provides a simplified technique for managing users within a software application. Specifically, the described system and method provides for simplified user management functionality for managing users within a software application. Instead of relying on a department or single user to process all user modification requests, including adding a new user or removing an existing user, the described system allows users who are already authorized within the system to make modifications related to other users. In other words, a user who has already been given permissions within the software application is allowed to make modifications, including additions or removals, to other users within the system based upon an association of the editing user and the user being modified. Such a system provides a simplified method for managing users within a software application, thereby eliminating the need to submit a request to a department or person in order to perform the desired modifications. Thus, the described system and method is more efficient than conventional systems, reduces user frustration, and reduces security risks.

For ease of understanding and readability, the user who is an existing user and is attempting to make changes to the users and/or user permissions will be referred to as an editing user; a user who is already identified within the software application and has at least some permissions, will be referred to as an existing user; and a user who is not already existing within the software application or who does not already have permissions within the software application will be referred to as an added user.

The described system and method will be discussed with respect to a healthcare enterprise for ease of readability. Additionally, for simplicity, the term "hospital" may be used here throughout. However, it should be understood by one skilled in the art that this term may refer to any healthcare enterprise, for example, long-term care facility, emergency department, healthcare staffing area, and the like. However, this is not intended to limit this disclosure to only software applications within a healthcare enterprise. As can be understood by one skilled in the art, the disclosed systems and methods can be applied to any software application and/or any entity hosting or providing a software application that includes users and/or user permissions.

The illustrated example embodiments will be best understood by reference to the figures. The following description is intended only by way of example, and simply illustrates certain example embodiments.

FIG. 1 illustrates a method for simplified user management functionality for managing users within a software application. The system provides a user management interface within a software application, as illustrated in FIG. 2 and discussed in more detail below. At 101 the system receives input from an editing user to perform an action corresponding to a user within the software application. The input is received within the user management interface of the software application. The action may be to modify users within the software application. Modifying users may include adding a user, modifying or editing existing users, removing a user, or the like.

The input may also provide an indication of the permissions or permission level that the added user or modified user should have within the software application. Thus, the modifications may also include changing permission settings for users being added to or existing users within the software application. For example, different users may have different permissions or permission levels within the software application. For example, some permissions may allow a user to only view data or a subset of data within the software application, whereas other permissions may allow a user to modify data, including adding and/or removing data, within the software application, modifying a subset of data within the software application, or the like. The entity hosting or providing the software application may set the permissions and/or permission levels.

At 102 the system, for example, the software application, may determine if or validate whether the editing user is authorized to perform the action within the software application. In validating that the editing user is authorized to perform the action, the system may determine that the editing user is an existing user within the software application. In other words, the system may determine that the editing user already has permissions within the software application. This determination may include comparing the credentials, user identifier (e.g., employee number, email address, user name, etc.), or the like, of the user providing the editing input to a list or database of users that are already existing within the software application. The system may also identify the permissions that are associated with the editing user.

In order to perform some security control over the modifications that an editing user can perform, the system may also determine that the user being added or modified is associated with the editing user in some manner. For example, the system may determine that the user being added or modified is associated with the same corporation as the editing user. In other words, the system may allow a user from one corporation to add users or modify users that are associated with the same corporation. Thus, the editing user may be unable to add or modify users that are not associated with the same corporation or that do not otherwise have an association with the editing user.

Instead of basing the association on the corporations of the editing user and user, the system may identify a different association between the users, for example, similar departments, hierarchical associations (e.g., manager and employee, group lead and group employee, etc.), similar titles, similar projects, or the like. To identify the associations the system may compare information associated with both the editing user and the other user. For example, the system may compare email addresses and determine that the domain name is similar between the email addresses of the two users. As another example, the system may determine that profiles of the two users include similar information.

Whether the user is authorized to perform the action may also be based upon the permissions or permission level associated with the editing user. For example, an editing user having only viewing permissions may not be authorized to add or modify users within the software application. As another example, an editing user having only viewing permissions may only be authorized to add or modify users within the software application to allow viewing data. In other words, the editing user may only be authorized to add users or modify permissions for existing users to allow the added or edited users to view data. As an alternative example, even if the editing user only has viewing permissions, the editing user may be allowed to add users or modify permissions of users to allow permissions greater than the permissions of the editing user. The authorization that is allowed to an editing user may be determined by the entity provisioning the software application. Other authorization parameters may be set within the software application.

If the user is not authorized to perform the action at 102, the system may not perform the action at 104. The system may additionally notify the editing user that the action is unable to be performed and may provide a notification indicating a reason why the action is unable to be performed. Additionally, the system may notify another user that an action that was requested was unable to be fulfilled. For example, if the system detects that the request may be a security breach, the system may notify another user that an unauthorized action was attempted to be performed, thereby allowing the other user to take action with respect to the software application to ensure the privacy or security of the software application is maintained.

If, on the other hand, the system determines that the editing user is authorized to perform the action at 102, the system may perform the action within the software application at 103. In other words, responsive to validating that the editing user is authorized to perform the action, the system may perform the action with respect to the user within the software application. For example, if the editing user is attempting to add a new user to the software application and the system determines that the editing user is authorized to perform such an action within the software application, the system may add the new user to the software application with either default permission settings or level or permission settings identified by the editing user. As another example, if the editing user is attempting to modify an existing user (e.g., modifying permission settings, modifying information associated with the user, removing a user, etc.) within the software application and the system determines that the editing user is authorized to perform such an action, the system may make the modifications the editing user is attempting to make.

FIG. 2 illustrates an example graphical user interface illustrating a possible user management interface for managing users within a software application. FIG. 2 illustrates an interactive display 200 that allows for user interaction and user input. A portion of the display 200 may display information associated with users already existing within the software application 201. In this example, the information includes a name and email address for the existing user. As should be understood, different information can be displayed in the interface, for example, an associated corporation, user identifier, or the like.

The interface also identifies the permission level of the user 202. The examples illustrated in FIG. 2 are "primary owner" and "member". These permission levels may designate what the user may do with respect to the data within the software application (e.g., edit, view, add, delete, etc.) and/or may identify what data within the software application the user can modify or manipulate. In other words, certain permission levels may only allow the user to access and/or modify a subset or portion of the data within the software application.

The interface also provides an interactive menu 203 that identifies the different actions that can be taken with respect to the corresponding user. For example, the interactive menu may be accessed to modify permissions or a permission level of the corresponding user, remove or otherwise remove the user, edit profile information for the user, or the like. Thus, when an editing user provides input to the interactive menu icon 203, the system may provide a pop-up window that displays a menu indicating the actions that can be taken with respect to the corresponding user. Once the editing user provides input to the interactive menu and the system determines that the editing user is authorized to perform that action with respect to the selected user, the system may make the indicated modification.

The interactive display 200 may also include an adding portion 204 that allows the editing user to provide input to add a new user to the software application. In the example of FIG. 2, this portion is indicated as the available invitations portion. In this example, the adding portion includes fillable fields to provide identifying information for the user being added or invited, for example, a first name fillable field, a last name fillable field, and an email address fillable field. Once the editing user has provided the information into the fillable fields, the editing user may interact with the invite icon 205. Input to this icon 205 causes the system to add, if the editing user is authorized to do so, the user to the software application. The editing user may also provide an indication of the permissions or permission level that should be associated with the added user. Alternatively, the permissions or permission level of the added user may be a default value or may be based upon the permissions or permission level of the editing user.

The various embodiments described herein thus represent a technical improvement to current systems for managing users within a software application. Instead of needing to submit a request for modifying, including adding and removing, users within the software application to a department or person and waiting for the request to be processed, the described system and method allows for users who are authorized within the system to perform these modification functions. The system is able to validate that the editing user is authorized to perform the modification and then allow the editing user to perform the desired modification. Thus, instead of having to wait for a request to be processed, modifications to users within the software application can happen quickly, thereby reducing user frustration, improving system efficiency, and, in some cases, reducing security risks, particularly for those users who need to be removed or who need to have permission levels decreased.

Figure 3:
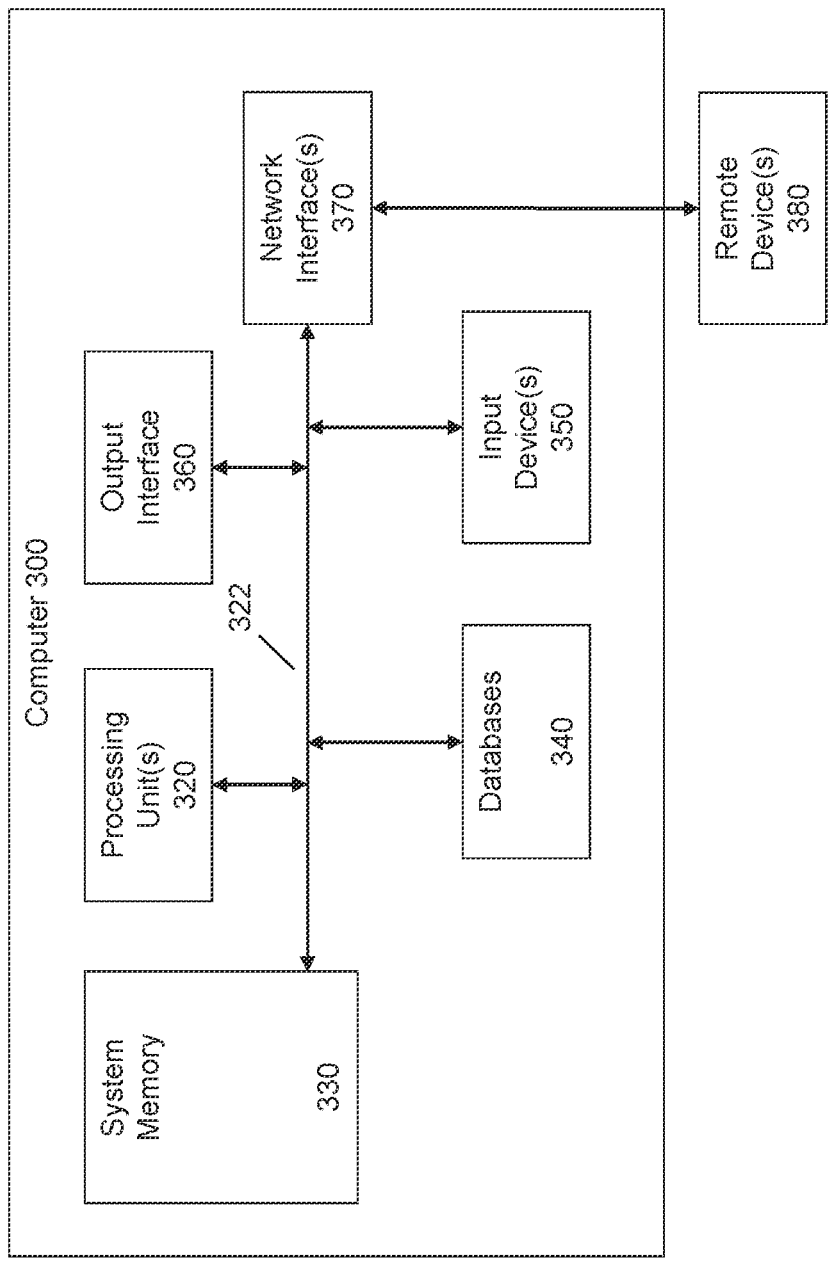
FIG. 3 illustrates an example of device circuitry.

While various other circuits, circuitry or components may be utilized in information handling devices, with a computer, server, client device or the like, an example device that may be used in implementing one or more embodiments includes a computing device in the form of a computer 300 as illustrated in FIG. 3. This example device may be a server used in one of the systems in a hospital network, or one of the remote computers connected to the hospital network. Components of computer 300 may include, but are not limited to, a processing unit 320, a system memory 330, and a system bus 322 that couples various system components including the system memory 330 to the processing unit 320. Computer 300 may include or have access to a variety of computer readable media, including databases. The system memory 330 may include non-signal computer readable storage media, for example in the form of volatile and/or nonvolatile memory such as read only memory (ROM) and/or random access memory (RAM). By way of example, and not limitation, system memory 330 may also include an operating system, application programs, other program modules, and program data.

A user can interface with (for example, enter commands and information) the computer 300 through input devices 350. A monitor or other type of device can also be connected to the system bus 322 via an interface, such as an output interface 360. The computer may include a database 340. In addition to a monitor, computers may also include other peripheral output devices. The computer 300 may operate in a networked or distributed environment using logical connections to one or more other remote device(s) 380 such as other computers. The logical connections may include network interface(s) 370 to a network, such as a local area network (LAN), a wide area network (WAN), and/or a global computer network, but may also include other networks/buses.

Information handling device circuitry, as for example outlined in FIG. 3, may be used in client devices such as a personal desktop computer, a laptop computer, or smaller devices such as a tablet or a smart phone. In the latter cases, i.e., for a tablet computer and a smart phone, the circuitry outlined in FIG. 3 may be adapted to a system on chip type circuitry. The device, irrespective of the circuitry provided, may provide and receive data to/from another device, e.g., a server or system that coordinates with various other systems. As will be appreciated by one having ordinary skill in the art, other circuitry or additional circuitry from that outlined in the example of FIG. 3 may be employed in various electronic devices that are used in whole or in part to implement the systems, methods and products of the various embodiments described herein.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method for providing simplified user management within a software application, the method comprising:
   receiving, within a user management interface of the software application, input from an editing user to perform an action corresponding to a user within the software application, wherein the action comprises modifying the user within the software application;
   validating, within the software application, the editing user is authorized to perform the action within the software application, wherein the validating comprises determining the editing user is an existing user having permissions within the software application and determining the user has a relationship to the editing user, wherein the validating comprises identifying a permission level of the editing user, identifying a permission level being assigned to the user, and determining the permission level of the editing user is at least equal to the permission level being assigned to the user, wherein a highest permission level allowed to be assigned to the user decreases as a permission level of the editing user decreases; and
   performing, responsive to validating the editing user is authorized to perform the action, the action with respect to the user in the software application.

2. The method of claim 1, wherein the modifying the user comprises at least one of: adding a new user to the software application, editing an existing user within the software application, and removing an existing user.

3. The method of claim 1, wherein the modifying the user comprises identifying permission levels for the user within the software application.

4. The method of claim 1, wherein the determining the user has a relationship to the editing user comprises determining the user and the editing user are associated with the same corporation.

5. The method of claim 1, wherein the determining the user has a relationship to the editing user comprises comparing information associated with the user and the editing user.

6. The method of claim 1, wherein the determining the permission level of the editing user is at least equal to the permission level being assigned to the user comprises determining the permission level being assigned is less than the permission level of the editing user.

7. The method of claim 1, wherein the validating is based upon authorization parameters set by an entity provisioning the software application.

8. The method of claim 1, wherein the modifying the user comprises adding a new user and wherein the performing the action comprises adding the new user to the software application.

9. The method of claim 1, wherein the modifying the user comprises modifying an existing user and wherein the performing the action comprises modifying attributes of the existing user within the software application.

10. A method for providing simplified user management within a software application, the method comprising:

displaying, on an interactive display, a user management interface display for managing at least one user within the software application, wherein the user management interface display comprises at least one adding portion for adding a new user to the software application and at least one editing portion for editing an existing user within the software application;

displaying, in the user management interface display and in response to an editing user selecting an interactive icon within the editing portion, an interactive menu providing actions allowing for editing an existing user, wherein the displaying comprises validating the editing user is authorized to edit the existing user by determining the editing user is an existing user having permissions within the software application and determining the user has a relationship to the editing user, wherein the validating comprises identifying a permission level of the editing user, identifying a permission level being assigned to the user, and determining the permission level of the editing user is at least equal to the permission level being assigned to the user, wherein a highest permission level allowed to be assigned to the user decreases as a permission level of the editing user decreases; and displaying, in the user management interface display and in response to the editing user providing input for adding a new user within the at least one adding portion, information corresponding to the new user, wherein the displaying comprises validating the editing user is authorized to add the new user by determining the editing user is an existing user within the software application and determining the editing user the user.

11. The method of claim 10, wherein the displaying information corresponding to a new user comprises assigning a default permission level to the new user.

12. The method of claim 10, wherein the actions contained within the interactive menu are based upon permission levels for the editing user within the software application.

13. The method of claim 10, wherein the determining the user has a relationship to the editing user comprises determining the user and the editing user are associated with the same corporation.

14. The method of claim 10, wherein the determining the user has a relationship to the editing user comprises comparing information associated with the user and the editing user.

15. The method of claim 10, wherein the determining the permission level of the editing user is at least equal to the permission level being assigned to the user comprises determining the permission level being assigned is less than the permission level of the editing user.

16. The method of claim 10, wherein the validating is based upon authorization parameters set by an entity provisioning the software application.

17. The method of claim 10, comprising displaying permission levels of the editing user within the software application.

18. The method of claim 10, comprising displaying modifications to the existing user within the software application responsive to receiving input within the interactive menu from the editing user.

* * * * *